United States Patent
Civerolo et al.

(10) Patent No.: US 9,923,741 B2
(45) Date of Patent: Mar. 20, 2018

(54) METHOD FOR DETECTING PRESENCE OR ABSENCE OF PHASE SHIFT KEYING MODULATIONS

(71) Applicant: SPAWAR Systems Center Pacific, San Diego, CA (US)

(72) Inventors: Michael P. Civerolo, San Diego, CA (US); Nicholas T. Johnson, San Diego, CA (US); Nicholas A. Lumsden, Escondido, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 15/468,168

(22) Filed: Mar. 24, 2017

(65) Prior Publication Data

US 2017/0279643 A1  Sep. 28, 2017

Related U.S. Application Data

(60) Provisional application No. 62/312,924, filed on Mar. 24, 2016.

(51) Int. Cl.
*H04L 27/00* (2006.01)
*H04L 27/233* (2006.01)

(52) U.S. Cl.
CPC ...... *H04L 27/0012* (2013.01); *H04L 27/2334* (2013.01)

(58) Field of Classification Search
CPC ............ H04L 27/2273; H04L 27/0012; H04L 2027/0073; H04L 27/2331; H04L 2027/0069; H04L 27/06; H04L 27/2332

USPC .......................................... 375/326, 340, 350
See application file for complete search history.

(56) References Cited

U.S. PATENT DOCUMENTS

| | | | | |
|---|---|---|---|---|
| 3,745,255 A | * | 7/1973 | Fletcher | H04L 5/12 329/308 |
| 4,972,431 A | * | 11/1990 | Keegan | G01S 19/30 342/357.69 |
| 5,295,151 A | | 3/1994 | Skudera et al. | |
| 5,430,770 A | * | 7/1995 | Abbey | H04B 1/123 375/346 |
| 5,977,821 A | | 11/1999 | Shibata | |
| 5,982,200 A | * | 11/1999 | Kimura | H04L 27/2273 327/113 |
| 6,297,691 B1 | * | 10/2001 | Anderson | H04L 27/2273 329/300 |

(Continued)

*Primary Examiner* — Emmanuel Bayard
(74) *Attorney, Agent, or Firm* — SPAWAR Systems Center Pacific; Kyle Eppele

(57) ABSTRACT

A signal detection method that allows characterization of a modulated signal to be efficiently determined. The method comprises the steps of receiving a data signal, processing the data signal to determine its value squaring the value of the signal; filtering the squared signal value to remove DC content; evaluating the resulting signal to determine if a single sinusoidal value remains; and determining that the presence of a single sinusoidal value as the resulting signal from the squaring and filtering steps indicates that the received data signal is a phase-shift key signal or conversely that the absence of such after a given number of cycle of squaring and filtering indicates a different modulation technique is present in the signal.

20 Claims, 6 Drawing Sheets

(56) References Cited

U.S. PATENT DOCUMENTS

| | | | |
|---|---|---|---|
| 6,584,205 B1 * | 6/2003 | Croft, III | H04R 3/00 381/103 |
| 6,983,029 B2 | 1/2006 | Alavi et al. | |
| 7,092,458 B2 | 8/2006 | Chan et al. | |
| 8,630,374 B2 | 1/2014 | Roh et al. | |
| 9,313,018 B1 * | 4/2016 | Tyler | H04L 7/027 |
| 2007/0058753 A1 * | 3/2007 | Saavedra | H03D 3/26 375/329 |
| 2007/0211829 A1 * | 9/2007 | Liang | H04L 25/03834 375/320 |

\* cited by examiner

METHOD FOR DETECTING PRESENCE OR ABSENCE OF PHASE SHIFT KEYING MODULATIONS

CROSS-REFERENCE TO RELATED APPLICATION

This application is a nonprovisional application claiming priority to U.S. Patent Application Ser. No. 62/312,924 filed on Mar. 24, 2016, entitled "Iterative Blind Detection Method for Phase Shift Keying Modulations" the entire content of which is fully incorporated by reference herein.

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103394.

FIELD OF THE INVENTION

The present invention pertains generally to the identification of a data signal without the benefit of knowing how the signal was modulated. More particularly, the present invention pertains to efficiently determining whether or not a PSK modulation is present on a received signal and if so what type of PSK modulation is present.

BACKGROUND OF THE INVENTION

One of the primary goals of wireless communication is to maximize the data rate while simultaneously making efficient use of the available spectrum. There are three primary methods of modulating a sine wave radio carrier; one of which is referred to as phase shift keying. Phase shift keying is a type of digital modulation which translates digital binary data (1's and 0's) into phase shifts on a carrier wave. For example a binary phase shift keyed (BPSK) system will transmit a particular sinusoidal signal to indicate a binary 1 and transmit the same sinusoid 180 degrees out of phase to indicate a binary 0. These two modulated waves would be referred to as the two BPSK "symbols". This type of modulation can transmit more information during every symbol by allowing more discrete phase states (e.g. 0, 90, 180, and 270 degree phase shifts instead of just 0 and 180). For instance, having four possible phase shifts in the transmitted sinusoid provides four different symbols; transmitting twice as much information per symbol (i.e. can transmit two bits per symbol as there are now 4 different symbols to transmit). Phase shift keying is a very common type of modulation that is used in many applications including cellular phones, wireless modems, military systems, satellite communications, and many more applications.

With the introduction of cognitive radios, software defined radios, and other similar systems; it is desirable to detect the modulation of a received signal without having prior knowledge of the signal. Current cognitive radios either detect modulation based on brute force methods of trying various demodulations schemes until one works or by using a lookup table to determine what the signal should or might be at a certain frequency. The first method is not computationally efficient and the second method is not dynamic and adaptable to new signals. Methods that accomplish the same result as this invention are computationally inefficient and require knowledge of the signal's data rate to create a signal to compare it to.

This new innovative solution allows for any PSK signal to be quickly categorized by the type of PSK modulation or determined to not be PSK modulated. This is done in a computationally efficient manner. Traditional methods use covariance or correlation to detect against a known signal, but these methods are limited by the stored signals used for comparison and require knowledge about the data rate of the signal. This new innovative method can successfully detect PSK signals with any data or symbol rate without prior signal knowledge in a computationally efficient means.

In view of the above, there is a need for simplified, efficient method for determining if a signal is a PSK type signal and if so its respective characterization.

SUMMARY OF THE INVENTION

This invention provides a technique for efficiently and quickly detecting whether an arbitrary signal is a PSK signal and if so what type of PSK modulated signal is present. A PSK signal could be a BPSK (binary phase shift keying, two symbols with 1 bit communicated per symbol), QPSK (quadrature phase shift keying, four possible symbols with 2 bits communicated per symbol), 8PSK (8 symbol phase shift keying, eight possible symbols with 3 bits communicated per symbol), or higher order M-PSK (M symbol phase shift keying, M possible symbols with $\log_2$ (M) bits communicated per symbol). This invention utilizes a trigonometric property of squaring cosines or sinusoids to force any PSK modulated signal to eventually converge to a single sinusoid. Unlike traditional correlation methods, this innovative method requires no information about the symbol or data rate of the signal.

These, as well as other objects, features and benefits will now become clear from a review of the following detailed description, the illustrative embodiments, and the accompanying drawings.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

This invention provides a method for efficiently and quickly detecting the specific modulation type on an arbitrary PSK signal. PSK can be BPSK (binary phase shift keying, two symbols with 1 bit communicated per symbols), QPSK (quadrature phase shift keying, four possible symbols with 2 bits communicated per symbol), 8PSK (8 symbol phase shift keying, eight possible symbols with 3 bits communicated per symbol), or higher order M-PSK (M symbol phase shift keying, M possible symbols with $\log_2$(M) bits communicated per symbol). This invention utilizes a trigonometric property of squaring cosines or sinusoids to force any PSK modulated signal to eventually converge to a single sinusoid. Unlike traditional correlation methods, this innovative method requires no information about the symbol or data rate of the signal.

Figure 1A:
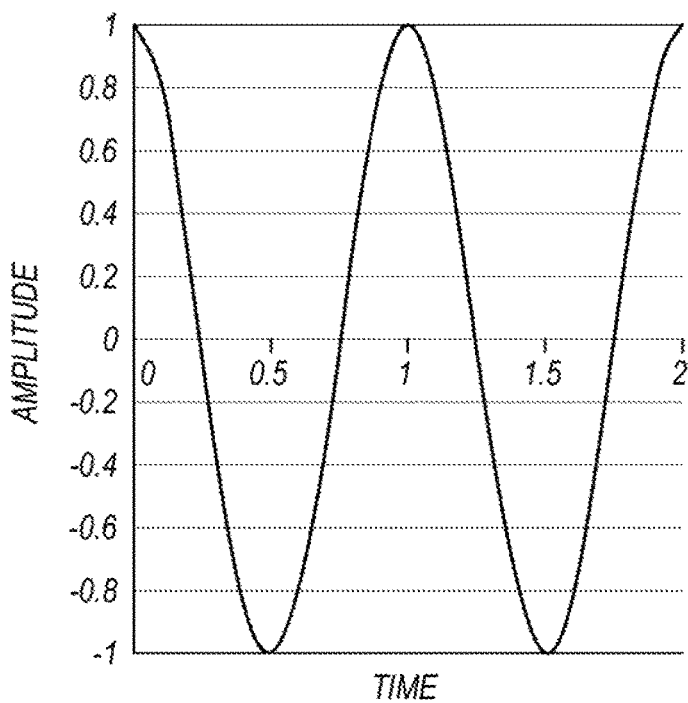
FIGS. 1A and 1B illustrates an example graphical depiction of BPSK sinusoidal and out of phase sinusoid signal plotted with respect to amplitude over time.
Figure 1B:
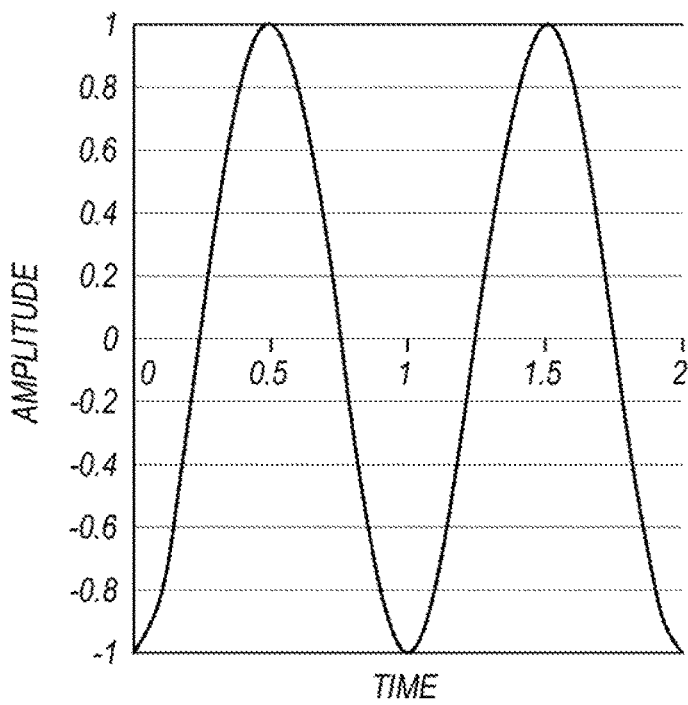
Figure 2A:
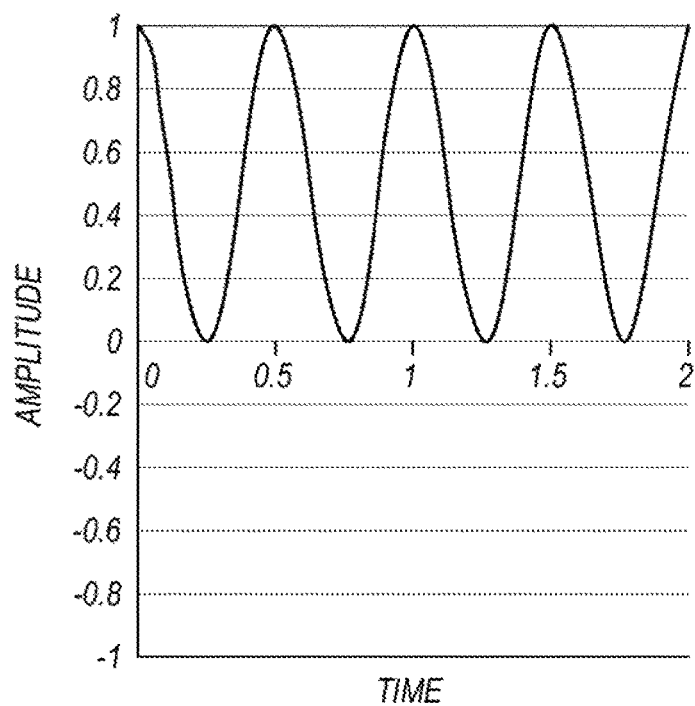
FIGS. 2A and 2B illustrates the graphical depiction of the example signal of FIGS. 1A and 1B after squaring their values.
Figure 2B:
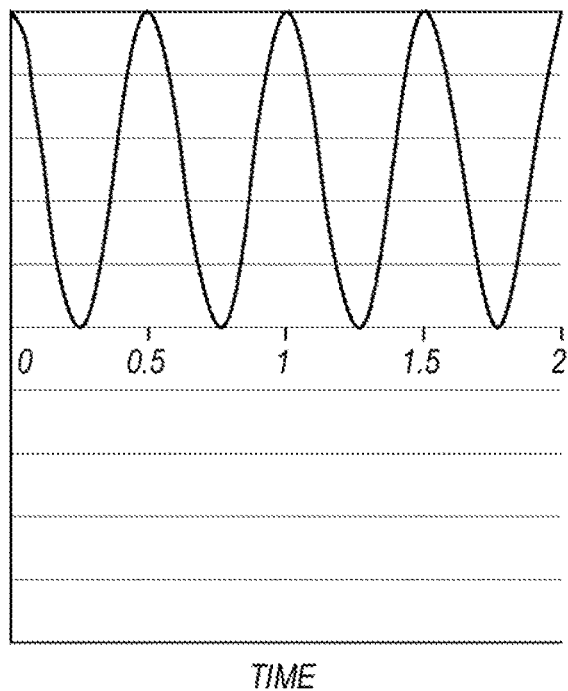
Figure 3A:
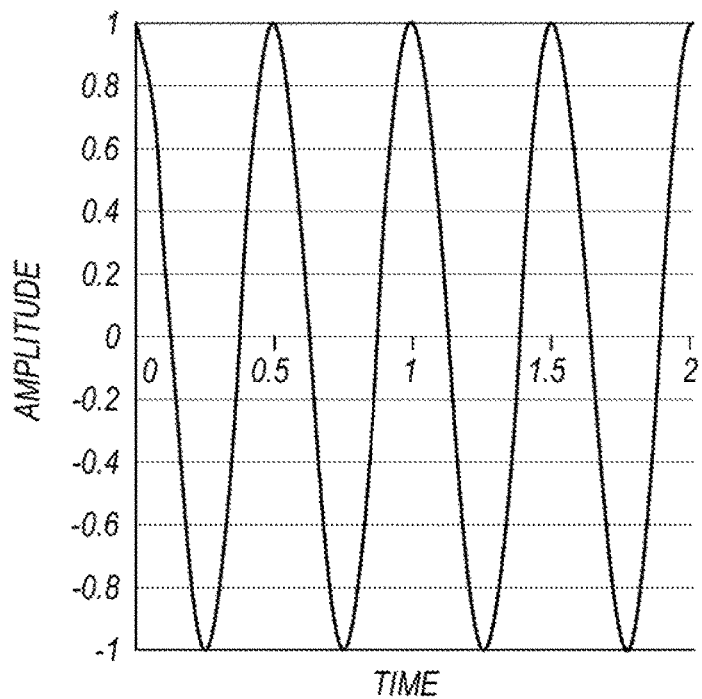
FIGS. 3A and 3B illustrates the graphical depiction of the example signal of FIGS. 2A and 2B after applying high pass filtering to the signal.
Figure 3B:
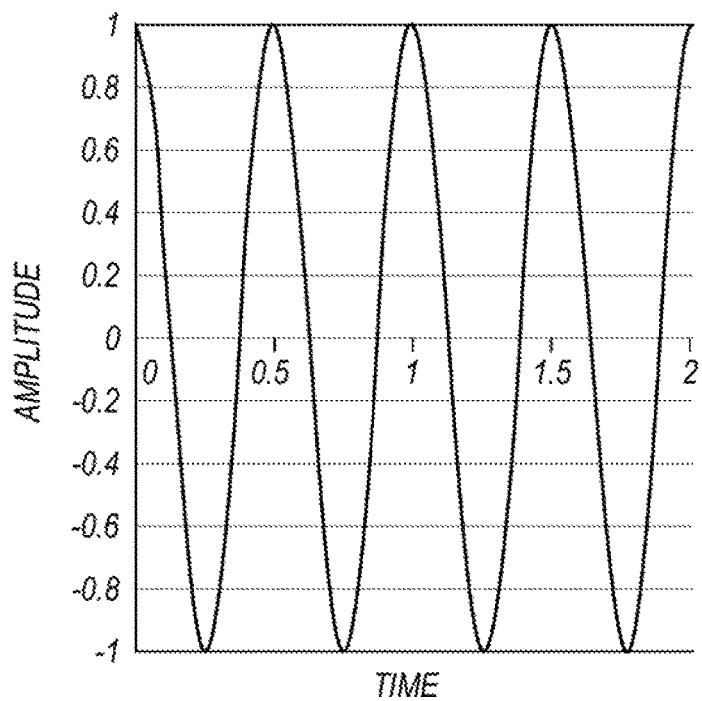

FIGS. 1 through 3 illustrate in graphical form the basic principle of the disclosed method for detecting PSK signal. For example purposes only the figures depict a BPSK signal. FIGS. 1A and 1B depict the two possible BPSK symbols, sinusoid and out of phase sinusoid (1, 0) of a hypothetical signal. These two symbols then squared as shown in FIGS. 2A and 2B. After squaring the signal values, the DC offset is removed via high pass filtering with the results illustrated in FIGS. 3A and 3B. As illustrated in FIGS. 1-3 the result of the squaring and high pass filtering converts all BPSK symbols into a single identical sinusoid.

Figure 4:
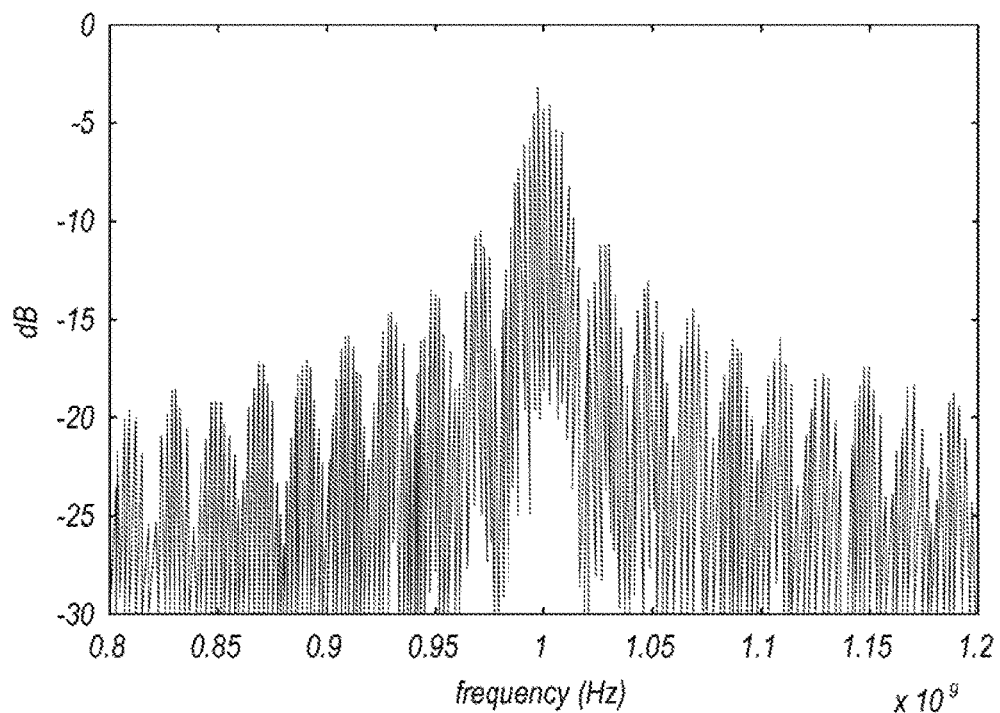
FIG. 4 illustrates a graphical representation of a generic BPSK signal with a 1 GHz center frequency and a 20 Mbps data rate.

The resulting single sinusoid is most easily detected spectrally. FIG. 4 shows the spectrum of a generic BPSK signal with a 1 GHz center frequency and a 20 Mbps data rate with no filtering. This signal is made up of two sinusoid symbols that are 180 degrees out of phase.

Figure 5:
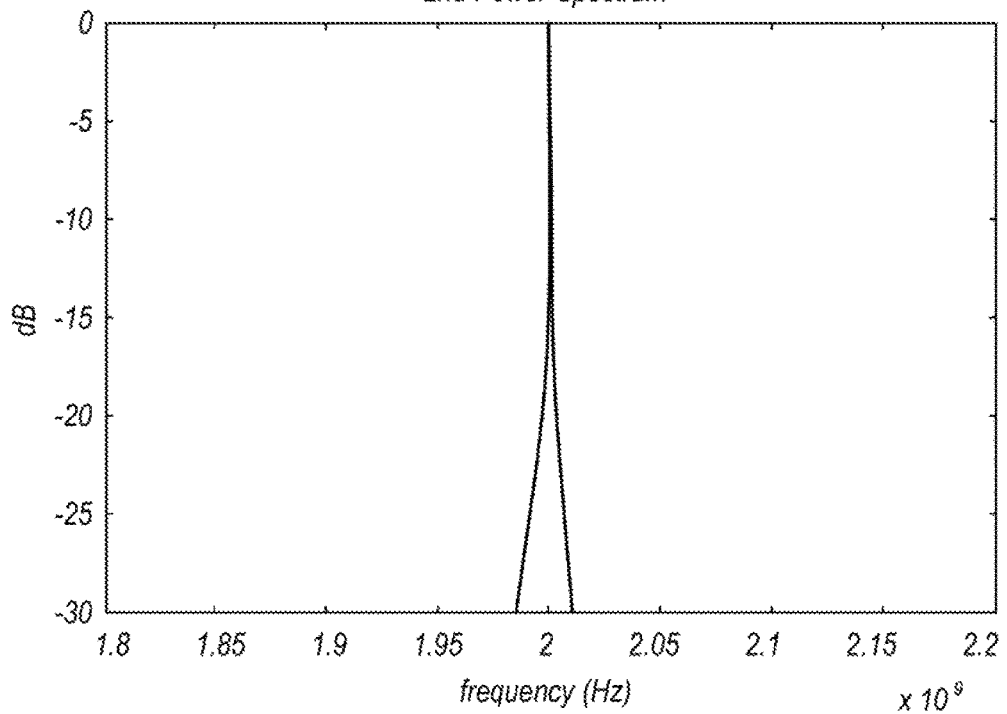
FIG. 5 illustrates a graphical depiction of the signal of FIG. 4 after it has been squared and high pass filtered.

FIG. 5 shows the result of squaring the BPSK signal and high pass filtering. Here it can be seen that the BPSK signal collapses to a single sinusoid after one iteration of squaring and DC removal. This is the basis of the invention method. The signal is put through an iterative loop of squaring and DC removal until the spectrum collapses to a single sinusoid. The number of iterations required to collapse the spectrum into a single sinusoid indicates the order of the modulation (M-ary, with M being 2, 4, 8, etc.) Conversely, if the signal spectrum does not collapse after a reasonable number of iterations it indicates that the signal is not PSK. This collapse to a single sinusoid happens in one iteration for BPSK, in two iterations for QPSK, in 3 iterations for 8PSK, in 4 iterations for 16PSK, and so on.

Figure 6A:
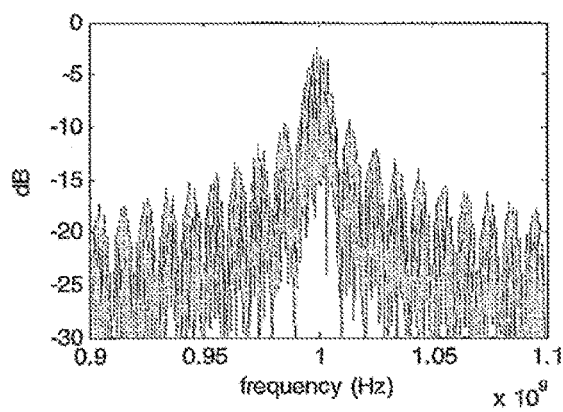
FIGS. 6A, 6B and 6C illustrates a graphical representation of a generic modulated sinusoid QPSK signal that is then squared and filtered yielding a single sinusoid signal.
Figure 6B:
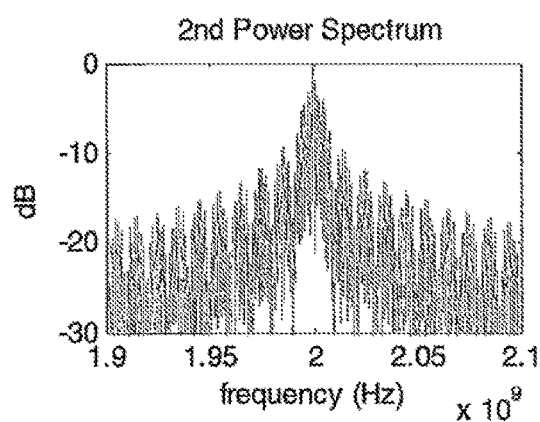
Figure 6C:
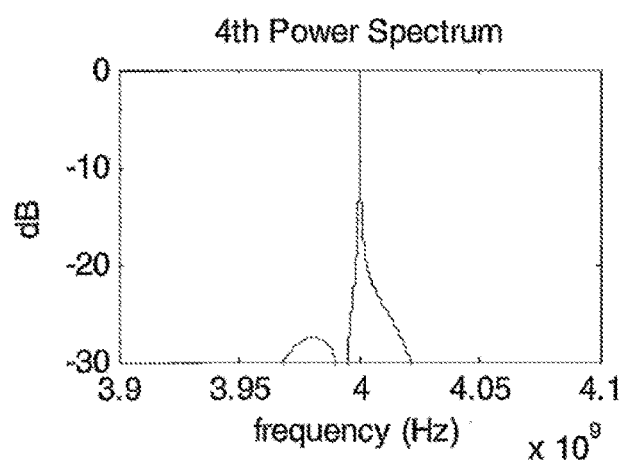

FIG. 6 shows this same method being used on a QPSK signal. The initial untouched spectrum is shown on the left indicating that the signal is a modulated sinusoid. The squared and filtered spectrum is shown in the middle indicating that the signal is a still a modulated sinusoid. As expected by the result of this invention, the spectrum collapses to a single sinusoid on the far right after two iterations, indicating that the signal is QPSK. The frequency scale on the bottom indicates the result of squaring. The center frequency doubles with each iteration.

The equations below indicate the exploited trigonometric properties that allow this innovative method to detect PSK signals without prior knowledge about the signals. Equation (1) shows the trigonometric identity for squaring a sinusoidal wave. Squaring the wave results in a sinusoid at twice the original carrier frequency with a constant addition to the wave (i.e. a DC offset). BPSK symbols consist of a sinusoid with 0 degrees of offset (x+0) and a sinusoid with 180 degrees of offset (x+180 deg). If the first sinusoid is squared, the resulting argument of the sinusoid is (2x), if the second sinusoid is squared the resulting argument of the sinusoid is (2x+360 deg) which is equivalent to (2x) since 0 deg=360 deg in phase shift (once complete revolution). This shows why both BPSK symbols turn into the same sinusoid after squaring and high pass filtering (to remove ½ DC term in equation (1)). This indicates that any BPSK signal will collapse to a single sinusoid (regardless of data rate) when squared with itself and high-pass filtered since both of the symbols that make up the signal result in the same sinusoid.

$$\text{Trigonometric identity } \cos^2(x) = \frac{1}{2} + \frac{1}{2}\cos(2x) \quad (1)$$

Equation 2 below shows how QPSK collapses to a single sinusoid. The four QPSK symbols are sinusoids with 45 (x+45 deg), 135 (x+135 deg), 225 (x+225 deg), and 315 (x+315 deg) degree offsets. If these symbols are squared the resulting sinusoid arguments are (2x+90 deg), (2x+270 deg), (2x+450 deg), and (2x+630 deg) respectively. When these sinusoids are simplified (i.e. remove 360 degrees) the argument are (2x+90 deg), (2x+270 deg), (2x+90 deg), and (2x+270 deg). This shows that one iteration of squaring and high pass filtering (to remove ½ DC term) turns QPSK into a two symbol PSK modulation (i.e. BPSK). One more iteration will turn the two symbol PSK (BPSK) into a single sinusoid. Therefore, any QPSK signal, regardless of data rate, will collapse to a single sinusoid after two iterations of squaring with itself and high-pass filtering. This same method works for higher order PSK by continuing the process.

$$\text{Squaring twice: } \cos^2(x) = \frac{1}{2} + \frac{1}{2}\cos(2x) \xrightarrow{HPF, rescale} \cos^2(2x) = \frac{1}{2} + \frac{1}{2}\cos(4x) \quad (2)$$

This method runs iterations of squaring and high pass filtering an incoming signal to determine whether it eventually collapses into a single sinusoid. If the signal eventually collapses to a single sinusoid in its spectrum, it is a PSK signal and the number of iterations required before it collapses indicate the type of PSK modulation used (i.e. BPSK, QPSK, 8PSK, etc.). If the signal does not collapse spectrally it is not PSK. This method will efficiently check unknown signals to see if they are PSK while indicating the type of modulation without any prior knowledge of the signal's data rate.

Figure 7:
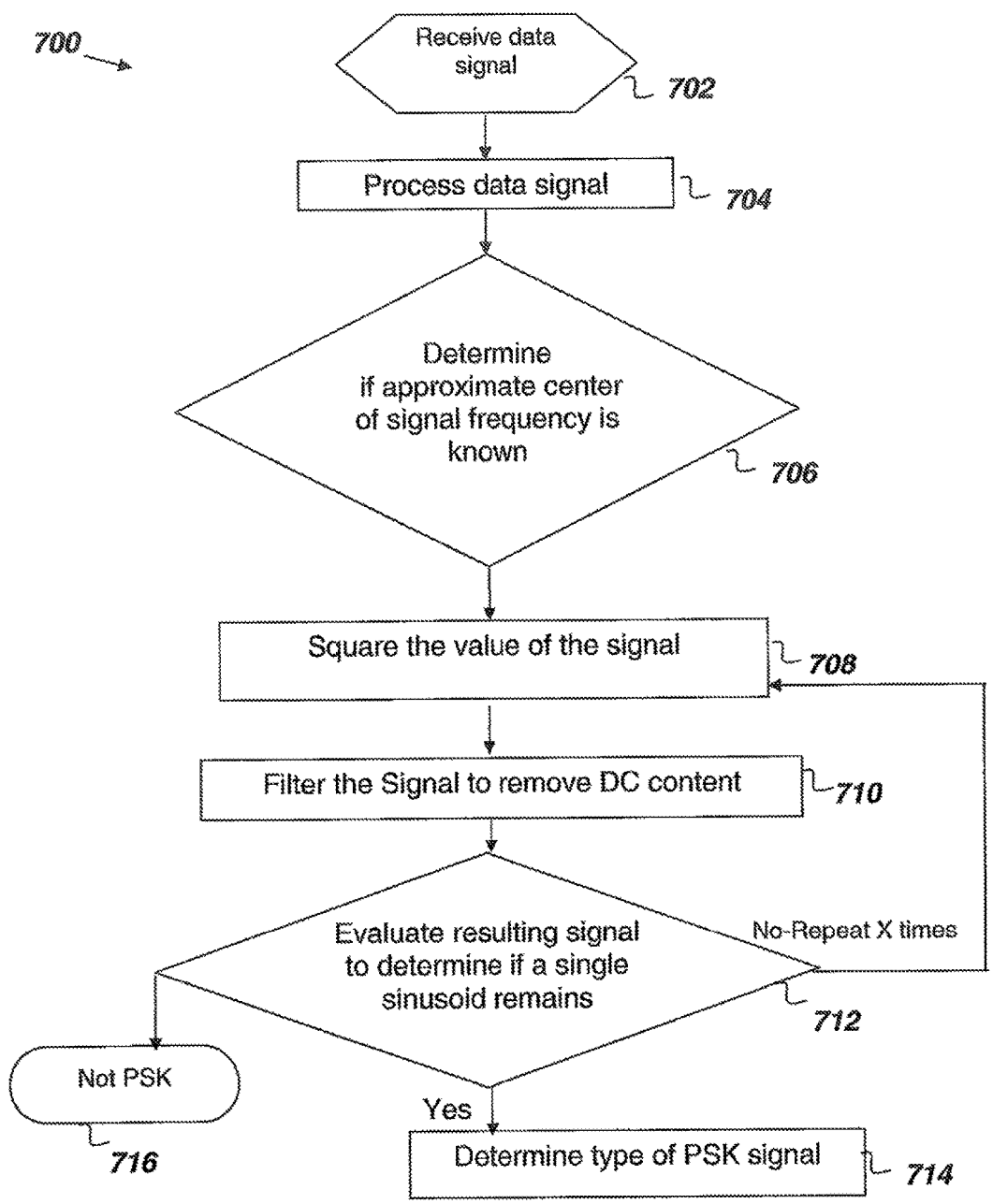
FIG. 7 illustrates one method of processing a signal in accordance with the teachings of the present disclosure.

FIG. 7 illustrates the steps associated with one method 700 of practicing the teachings of this disclosure. The method begins when one receives a data signal, step 702. After receipt of a data signal its value is recorded, Step 704. The recorded data signal is then evaluated to determine if the signal frequency is recognized, step 706. If the signal is not recognizable then the next step in the process, step 708 is to square the value of the signal. The squared signal value is then filtered to remove DC content, step 710. At this point the original received signal that has been squared and filtered is evaluated to determine if a single sinusoidal component remains, step 712; if yes the signal is a PSK type signal, if no steps 708, squaring and 710 filtering are repeated and the resulting signal evaluated to determine if a single sinusoid remains. This process is repeated as many times as necessary if a single sinusoid is not the resulting component. If repeating the process results in a single sinusoid remaining, then the number of iterations directly correlates to the type of PSK signal, step 714, where the type of M-ary M-PSK modulation (M=2, 4, 8, 16, 32, etc) is found from M being equal to 2 raised to the exponential power of the number of iterations (i.e. M= $2^{number\_of\_iterations}$) If completing ten iterations of squaring, filtering and evaluating (steps 708, 710, and 712) fails to yield a single sinusoid as the resulting signal, then a determination is made that the original received data signal (step 702) is not a PSK signal or that the M-ary value is greater than 1024 ($2^{10}$).

This new innovative detection method allows any PSK signal to be efficiently detected without any prior knowledge of the signal's modulation or data rate. Only the signal's approximate center frequency must be known. This method differs from prior art methods for detecting PSK signal that are performed by comparing the incoming signal to known signals until a match is identified which is computationally inefficient and only works when the incoming signal is very close in frequency and data rate to the expected signal. The detection method disclosed herein is efficient and requires no prior knowledge of the data rate. This method is new in that it does not required comparison to know signals or any correlation. The method squares the incoming signal with itself, filters the signal, and evaluates the resulting spectrum.

It will be understood that changes in the details and steps arrangement of parts, which have been herein described and illustrated to explain the nature of the invention, may be made by those skilled in the art within the principle and scope of the invention as expressed in the appended claims.

What is claimed is:

1. A method for determining the modulation characteristics of a signal, comprising the steps of:
   receiving a data signal;
   processing the data signal to determine its value;
   performing the mathematical step of squaring the value of the signal;
   filtering the squared signal value to remove DC content;
   evaluating the filtered squared signal to determine if a single sinusoidal value remains; and
   determining that the presence of a single sinusoidal value as the resulting signal from the squaring and filtering steps indicates that the received data signal is a phase-shift key signal.

2. The method of claim 1, further including the steps of repeating the squaring and filtering until a single sinusoidal value is the resulting value.

3. The method of claim 2, further including the step of counting the number of times the squaring and filtering steps are performed which eventually yields a single sinusoidal value in order to classify the type of phase shift key signal.

4. The method of claim 3, wherein if the squaring and filtering are performed once and then yields a single sinusoidal value, the data signal is determined to be a BPSK signal.

5. The method of claim 3, wherein if the squaring and filtering are performed twice times and then yields a single sinusoidal value, the data signal is determined to be a QPSK signal.

6. The method of claim 3, wherein if the squaring and filtering are performed three times and then yields a single sinusoidal value, the data signal is determined to be a 8PSK signal.

7. The method of claim 3, wherein if the squaring and filtering are performed four times and then yields a single sinusoidal value, the data signal is determined to be a 16PSK signal.

8. The method of claim 3, wherein if the squaring and filtering are performed ten times fails to yield a single sinusoidal value the data signal is determined not to be a PSK type signal.

9. A method for determining if a data signal of an approximate known center frequency is a phase-shift key type signal, comprising the steps of:
   receiving a data signal;
   processing the data signal to determine its value;
   performing the mathematical step of squaring the value of the signal;
   filtering the squared signal value to remove DC content;
   evaluating the filtered squared signal to determine if a single sinusoidal value remains; and
   determining that the presence of a single sinusoidal value as the resulting signal from the squaring and filtering steps indicates that the received data signal is a phase-shift key signal.

10. The method of claim 9, further including the steps of repeating the squaring and filtering until a single sinusoidal value is the resulting value.

11. The method of claim 10, further including the step of counting the number of times the squaring and filtering steps are performed which eventually yields a single sinusoidal value in order to classify the type of phase shift key signal.

12. The method of claim 11, wherein if the squaring and filtering are performed one time and then yields a single sinusoidal value, the data signal is determined to be a BPSK signal.

13. The method of claim 11, wherein if the squaring and filtering are performed two times and then yields a single sinusoidal value, the data signal is determined to be a QPSK signal.

14. The method of claim 10, wherein if the squaring and filtering are performed three times and then yields a single sinusoidal value, the data signal is determined to be a 8PSK signal.

15. The method of claim 10, wherein if the squaring and filtering are performed four times and then yields a single sinusoidal value, the data signal is determined to be a 8PSK signal.

16. The method of claim 10, wherein if the squaring and filtering are performed ten times fails to yield a single sinusoidal value the data signal is determined not to be a PSK type signal.

17. A method for determining if a data signal is not a phase-shift key signal, comprising the steps of:
   receiving a data signal;
   processing the data signal to determine its value;
   performing the mathematical step of squaring the value of the signal;
   filtering the squared signal value to remove DC content;
   evaluating the filtered squared signal to determine if a single sinusoidal value remains; and
   determining that the absence of a single sinusoidal value as the resulting signal from the squaring and filtering steps above indicates that the received data signal is not a phase-shift key signal.

18. The method of claim 17, further including the steps of repeating the squaring and filtering steps.

19. The method of claim 17, wherein the steps of squaring and filtering the signal are repeated a minimum of ten times before determining that the absence of a single sinusoidal value as the resulting signal indicates that the data signal is not a phase shift key type signal.

20. The method of claim 17, wherein the approximate center frequency of the data signal is known.

* * * * *